(12) United States Patent
Plotnik et al.

(10) Patent No.: US 12,292,982 B2
(45) Date of Patent: May 6, 2025

(54) SYSTEM, METHOD, AND PROCESS FOR DETECTING RISKS ACROSS APPLICATION AND INFRASTRUCTURE CODE

(71) Applicant: APIIRO LTD., Tel Aviv (IL)

(72) Inventors: Idan Plotnik, Herzliya (IL); Yonatan Eldar, Tel Aviv (IL); Eli Shalom, Tel Aviv-Jaffa (IL); Ariel Levy, Haifa (IL)

(73) Assignee: APIIRO LTD., Tel Aviv (IL)

( * ) Notice: Subject to any disclaimer, the term of this patent is extended or adjusted under 35 U.S.C. 154(b) by 336 days.

(21) Appl. No.: 17/974,670

(22) Filed: Oct. 27, 2022

(65) Prior Publication Data

US 2023/0132503 A1 May 4, 2023

Related U.S. Application Data

(60) Provisional application No. 63/272,696, filed on Oct. 28, 2021.

(51) Int. Cl.
    *G06F 21/57* (2013.01)
(52) U.S. Cl.
    CPC ...... *G06F 21/577* (2013.01); *G06F 2221/033* (2013.01)
(58) Field of Classification Search
    CPC ...... G06F 21/577; G06F 21/563; G06F 21/54; G06F 2221/033; G06F 9/54
    See application file for complete search history.

(56) References Cited

U.S. PATENT DOCUMENTS

| | | | | |
|---|---|---|---|---|
| 10,657,253 | B2* | 5/2020 | Lie | G06F 21/563 |
| 11,106,801 | B1* | 8/2021 | Levine | G06F 11/3692 |
| 2006/0259973 | A1* | 11/2006 | Sima | G06F 21/577 |
| | | | | 726/25 |
| 2006/0282897 | A1* | 12/2006 | Sima | G06F 11/3698 |
| | | | | 726/25 |
| 2014/0165204 | A1* | 6/2014 | Williams | G06F 21/55 |
| | | | | 726/25 |
| 2018/0121659 | A1* | 5/2018 | Sawhney | G06F 21/566 |
| 2019/0347424 | A1* | 11/2019 | Bezzi | G06F 21/577 |
| 2020/0364345 | A1* | 11/2020 | Hecht | G06F 21/577 |
| 2021/0157926 | A1* | 5/2021 | Handurukande | G06F 21/563 |
| 2022/0060501 | A1* | 2/2022 | Liu | G06F 21/554 |
| 2022/0067168 | A1* | 3/2022 | De Cremer | G06F 9/451 |

(Continued)

FOREIGN PATENT DOCUMENTS

CN 113961934 A * 1/2022

*Primary Examiner* — Khalid M Almaghayreh
(74) *Attorney, Agent, or Firm* — Rivka Friedman

(57) ABSTRACT

A method for unifying risks and remediations associated with entities in application and infrastructure code, including the steps of: defining governance rules; fetching data from more than one source; extracting features from the data in a unified manner; formalizing sub-entities from the extracted features, the formalized sub-entities representing the extracted features in a formal and unified manner; providing a plurality of entities from the formalized sub-entities, matching and unifying sub-entities having common extracted features into single entities of the plurality of entities; aggregating risks and remediations of each of the same sub-entities and assigning the aggregated risks and remediations to the corresponding single entity; and computing risk priority and triggering workflows based on the matched governance rules.

6 Claims, 2 Drawing Sheets

(56) References Cited

U.S. PATENT DOCUMENTS

| | | | |
|---|---|---|---|
| 2022/0067169 A1* | 3/2022 | De Cremer | G06F 9/451 |
| 2022/0067174 A1* | 3/2022 | Gupta | G06F 21/566 |
| 2022/0100868 A1* | 3/2022 | Tarrant | G06N 20/00 |
| 2023/0126950 A1* | 4/2023 | Soudhamma | H04L 63/1433 726/25 |

* cited by examiner

FIG. 1

| Code Entity | | | Cloud Component | | |
|---|---|---|---|---|---|
| PDO | | | DAO | | DB |
| R1 | r[1,1],...,r[1,n] | | R2 | r[2,1],...,r[2,n] | R3 | r[3,1],...,r[3,n] |
| M1 | m[1,1],...,m[1,n] | | M2 | m[2,1],...,m[2,n] | M3 | m[3,1],...,m[3,n] |

PDO —Code Link— DAO —Configuration Link— DB

FIG. 2

| Code Entity | | Cloud Component | |
|---|---|---|---|
| Framework usage | | Bucket | |
| R2 | r[2,1],...,r[2,n] | R3 | r[3,1],...,r[3,n] |
| M2 | m[2,1],...,m[2,n] | M3 | m[3,1],...,m[3,n] |

Framework usage —Configuration Link— Bucket

SYSTEM, METHOD, AND PROCESS FOR DETECTING RISKS ACROSS APPLICATION AND INFRASTRUCTURE CODE

This patent application claims priority from, and the benefit of, U. S. Provisional Patent Application No. 63/272,696, filed Oct. 28, 2021, which is incorporated in its entirety as if fully set forth herein.

FIELD OF THE INVENTION

The present invention relates to the detection and protection of security and compliance risks early in the development processes and, more particularly, to a system, method, and process for detecting risks across application and infrastructure code by correlating the application code, infrastructure code, developer behavior and providing more context.

BACKGROUND OF THE INVENTION

In the cloud-native world, there are three separate areas of responsibility:
1. Software Developer—responsible for the application logic and application security/privacy.
2. DevOps—responsible for the cloud infrastructure (e.g., compute, networking, network security, identity management, storage, etc.).
3. DevSecOps—responsible for the security and compliance of both the application and the infrastructure.

The problem is that they are very strongly related, meaning that they can easily (and unintentionally) impact each other. For example: if the software developer develops a new sensitive API in a high business impact, internet-facing, application that reads Personal Identifiable Information (PII) data from cloud storage (e.g., Storage Bucket), and the DevOps practitioner (by mistake) does not enable encryption on this cloud storage, this will introduce a security and compliance risk.

Current tools use a single-dimension risk approach. The application security tools scan the application's code and detect vulnerabilities like SQL Injection, XSS, CSRF, etc., while the infrastructure security tools scan the infrastructure's code to detect misconfigurations like "Cloud SQL database instance incoming connections missing encryption in transit" or "Cloud storage buckets are not encrypted."

Static application security testing (SAST), or static analysis, is a testing methodology that analyzes source code to find security vulnerabilities that make an organization's applications susceptible to attack. SAST scans an application before the code is compiled. This is also known as white box testing.

Dynamic application security testing (DAST) is a program used by developers to analyze a web application (web app), while in runtime, and identify any security vulnerabilities or weaknesses. Using DAST, a tester examines an application while it is working and attempts to attack it as a hacker would. This is also known as black box testing.

SUMMARY OF THE INVENTION

The present invention successfully addresses the shortcomings of the presently known configurations by providing a system, method and process that consists of a multidimensional risk engine that analyzes, for example, the application code, infrastructure code, developers' knowledge and activity, the business impact of the application, the deployment location, the sensitivity of the data that the application holds, etc. Then, the system connects all these elements into a meaningful and contextual story to help developers and DevOps detect and prevent the risks before they are deployed in the cloud.

According to the present invention there is provided a method for unifying risks and remediations associated with entities in application and infrastructure code, including the steps of: defining governance rules; fetching data from more than one source; extracting features from the data in a unified manner; formalizing sub-entities from the extracted features, the formalized sub-entities representing the extracted features in a formal and unified manner; providing a plurality of entities from the formalized sub-entities, matching and unifying sub-entities having common extracted features into single entities of the plurality of entities; aggregating risks and remediations of each of the same sub-entities and assigning the aggregated risks and remediations to the corresponding single entity; and computing risk priority and triggering workflows based on the matched governance rules.

According to further features the method further includes: enriching the entities based on a level of expertise and familiarity of contributors, prior to the step of computing the risk priority.

According to still further features the governance rules are defined based on at least one of: suggesting governance rules based on contextual data of unified or relatable entities, identifying missing governance rules, and importing of governance rules from other systems, based on similarities between entities of the other systems and the plurality of entities.

According to still further features at least some of the risks and remediations are provided by code scanners.

According to still further features entities are enriched using information extracted from build systems.

BRIEF DESCRIPTION OF THE DRAWINGS

Various embodiments are herein described, by way of example only, with reference to the accompanying drawings, wherein:

FIG. 1 is a diagram of compound data entity defined in multiple locations with risks and remediations in each location;

FIG. 2 is a diagram of a storage bucket defined in a cloud component and used by source code;

DESCRIPTION OF THE PREFERRED EMBODIMENTS

Figure 3:
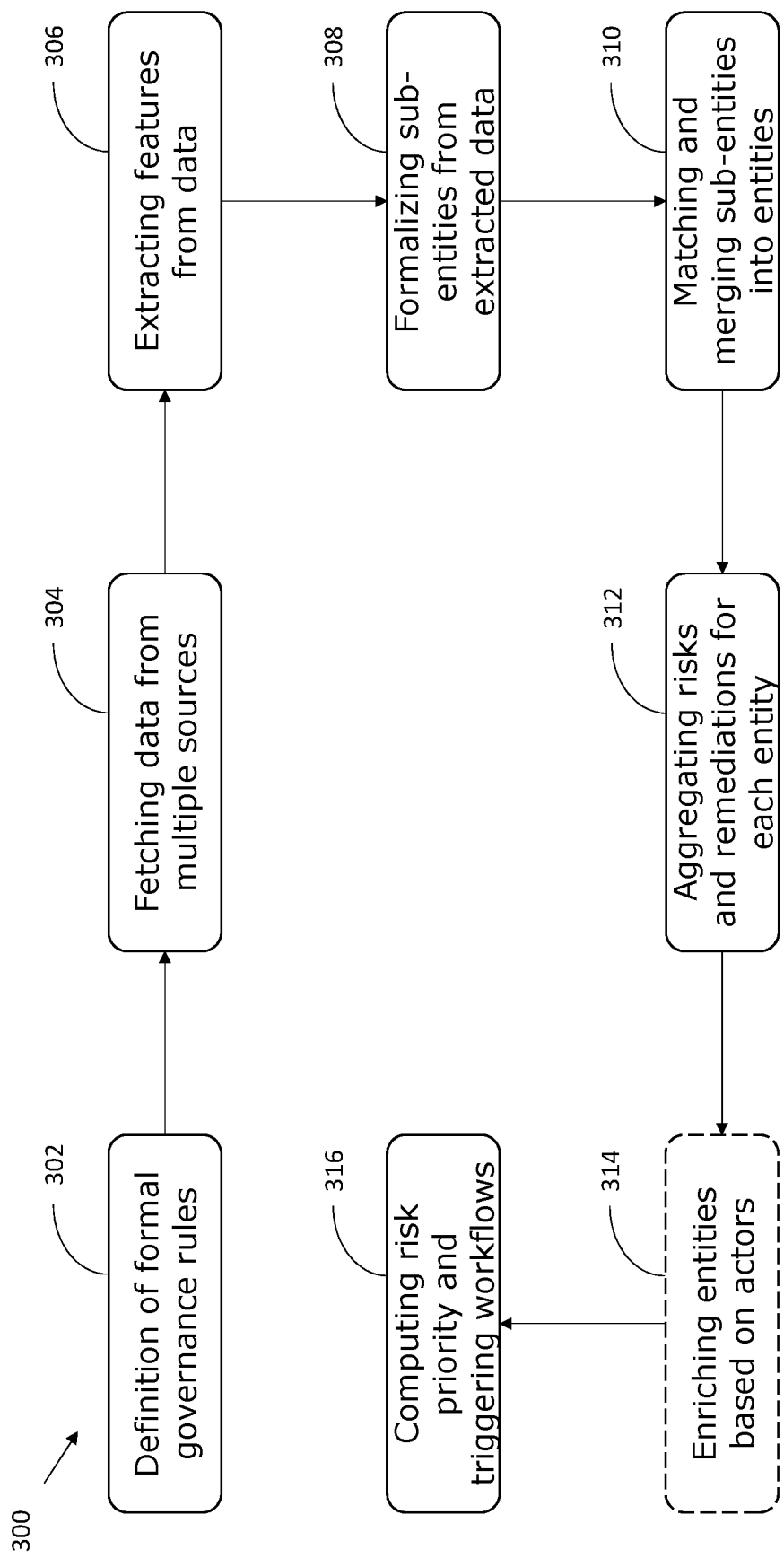
FIG. 3 is a flow diagram of a process 300.

The principles and operation of a system, method, and process for detecting risks across application and infrastructure code according to the present invention may be better understood with the accompanying description.

The present innovation covers the conceptualization of unifying entities across multiple locations and definitions, the key methods for extraction, as well as the monitoring and enforcement of policies over the entities.

High-Level Collection of the Data

To achieve a good perception of an entity's risk, one has to know all the risk factors the entity involves, along with the remediations already in place. For example, an API that involves personal information would have risk factors related to an information leak and compliance. Encryption of the data, proper authorization, and a review would remediate the risk.

Entities are defined across multiple locations, such as different locations in the code, configurations, and in cloud components. In each entity's location, both risk factors and remediations can be present. For example, an API handler can both deal with personal information (risk), and also encrypt the data (remediation). An API gateway may save logs of requests (risk), and also define authorization (remediation).

A collection of the risks and remediations for each entity is required to evaluate the actual risk of an entity. The instant technology presents a mechanism for collecting and unifying the risks and remediations such that:

Given entity E composed of parts defined in multiple locations $E_1, E_2, \ldots, E_n$, and each introduces risks $R_1, R_2, \ldots, R_n$ and remediations $M_1, M_2, \ldots, M_n$ correspondingly. The actual risk of the entity E is $R=R_1 \cup R_2 \cup \ldots \cup R_n$, and remediation is $M=M_1 \cup M_2 \cup \ldots \cup M_n$.

To be able to collect the entities, a mechanism for collection is required. One example mechanism that performs such a task is described in U.S. Patent Application Pub. No. US2020/0379879, now U.S. Pat. No. 11,301,356 B2, which is incorporated by reference as if fully set forth herein, and additional mechanisms for extraction of configurations and cloud components will be described in the following sections.

In order to unify the risks and remediations associated with the entities, a matching mechanism is required. Such a mechanism will also be described in the following sections.

Governance

Companies use standard policies, or define custom policies, to manage risks introduced by code and components. In most cases, these policies are described in documents and are being enforced using a primarily manual process: questionnaires, design reviews, code reviews, external auditing, etc.

The manual process requires a lot of resources. A few reasons for this are:
 A reviewer needs to identify relevant changes out of many irrelevant changes.
 A reviewer needs to collect the entity components out of many systems. The process requires access, knowledge, and understanding that the reviewer does not necessarily have.
 A reviewer needs to match the state, risk-wise, with the matching policy.
 A reviewer needs to verify that the remediations in place comply with the matched policy.
 If the remediations do not comply with the policy, the reviewer needs to follow up until they do.

A formalization of policies enables verification of the state of entities, given that the entities can be formally represented. The present technology adds on top of previous general formalization processes:
 A suggestion mechanism for building governance rules based on contextual data of unified or relatable entities.
 A mechanism for identifying missing governance rules.
 Importing of governance rules from other systems, based on entities' similarity.

The formalization of the governance rules, combined with an automatic collection of compound entities' states, result in a significant reduction in the amount of effort that needs to be expended:
 An entity's state has been composed of multiple sources in a formalized manner
 Governance rules have been defined formally.
 Matching of entities with governance rules is done automatically and continuously.
 Automation can be applied automatically:
  Filtering of relevant changes/entities that require review.
  Triggering of workflows based on required remediations.

The present technology introduces a few novelties regarding governance, such as, for example, the ability to formalize entities along with risks and remediations, the ability to define the rules of best fit, and the ability to control compound entities that are defined across multiple locations.

Given the ability to formalize entities and their compositions, the system can draw a similarity between entities and compositions across different systems. Flowingly, the system can recommend [im]porting governance rules between systems using the similarity between the entities and compositions.

Extraction

The following sections describe the process of extraction and unification of entities over several locations. The common pattern across the processes includes: an extraction from code, configurations, and other common representations; matching the entities by common properties; and unifying them. The following processes are concrete ones, yet the invention is not limited to them, as they show a generalized method. Therefore, the following example processes should not be understood as limiting the invention in any way.

Cloud Components

Databases (DB)

Databases are widely used in all sections of applications. They can run locally, in a dedicated server (physical or virtual), in the cloud as a PAAS (Platform As A Service or application platform as a service or platform-based service) service, or any combination of thereof. Each variation requires its own method of extraction:
 Analysis of Kubernetes manifests is made to detect the use of open-source base images that are shipped with database technologies.
 Terraform™ configurations are parsed to extract Infrastructure as Code (IaC) DBs and configurations, and in most cases, a network context is supplied out of the box.
 Bash script and CI/CD (Continuous Integration/Continuous Delivery) pipeline definitions are lexed and parsed to find the execution sequences of many known databases. This identifies native executions of databases.

Together with that, the system analyzes (automatically, semi-automatically or manually) the application code to find data access objects (DAO), persisted data object (PDO), schemas, and connection strings. With the combination of those, we can compare and match infrastructure code and configurations to application code. For example, if the system detects a connection string in Java code that relates to a Terraform™ static IP definition that is linked to a DB, together with a DAO that is accessing that same IP, both added at a relatively close time by organizationally related developers, the system can predict that there is a relation and that the PDO that was extracted from the app code is persisted in the DB that was detected in Terraform™.

FIG. 1 depicts a diagram of compound data entity defined in multiple locations with risks and remediations in each location. FIG. 1 illustrates an example, flow-based risk, of a DB process. The example process is composed, along with per-entity risk, showing extensive context of code entities interacting with an infrastructure component, and where risk and mitigation factors are aggregated from multiple locations across code and infrastructure into a unified representation.

Lambda™

Lambda™ functions, or serverless computing, is a cloud resource allowing to perform computation tasks without much preparation in a seamless context. They are considered a potential risk as they are usually granted high cloud privileges and can access many resources.

Serverless definitions can be written in Terraform™ or other IaC technologies or in each cloud provider resource configuration language.

The system can, for example, analyze serverless.yml that is used in AWS™ to define the settings needed to spin up application code into a serverless function slot. This, again, can hint at a connection between application code and Infrastructure and enable the deduction of combined insights, such as sensitive data exposed through the Lambda™ endpoint.

Storage Buckets

Storage buckets are a popular cloud storage technology. They supply flexible access from practically anywhere, which makes them very functional and very vulnerable.

Storage buckets can be extracted from Terraform™ configurations and other IaC languages, together with their names, network context, and access policies. Storage buckets are used for a wide variety of applications, from storing data, backup, logs, configurations, etc.

It is common to access storage buckets from application logic code, both to read and write, using publicly available Software Development Kits (SDKs). Those SDKs are reverse engineered with reflection tools, extracting their endpoints that are classified as read and write operations.

Given the extraction of bucket usage in code and the definition of the bucket, the risk and remediation can be formalized and thus be checked against the policies in the organization.

FIG. 2 depicts a diagram of a storage bucket defined in a cloud component and used by source code. In the example process, extensive context of usage of a cloud component is depicted. Risk and mitigation factors are aggregated along with a detailed relation between the cloud component and its usage.

Key Management Systems (KMS)

Key management systems (KMS) are a growing practice to avoid holding secrets in the code itself, reducing the risk of a breach to the server. However, at the same time, the KMS can hint to where sensitive information (secrets) are used in the code or infrastructure and focus risk assessment on that area; for example, when detecting requests that are sent to a KMS endpoint from code, or when predicting that a seemingly random string is of a KMS provider format, the system/algorithms can focus on the exit point of this module or file and the data exposed from there.

In addition to that, KMS usage is often a strong indicator for the system to attribute infrastructure code to application code. If the system can extract the key-ring name and the domain name from the code and see the same information in IaC code, a valid relation between the modules is formed. In case ambiguous relations are formed, a prediction mechanism or a focused question would be raised to the user.

Queues

Queues are a modern way to communicate between services in a microservices architecture and balance loads in scalable applications. Queues are considered to be an attack surface with significant risk; they transfer sensitive information (for example they could hold PII or execution context) and sometimes bridge a gap between different networks and zones. Cloud-native queues could be defined in IaC configurations or detected through configuration files, and the interaction from code could be by using dedicated SDKs or arbitrary direct communication (sockets, web, RPC).

The combination of the queue configuration is designed to detect in IaC and the extraction of the access in code, using language analysis to understand if it's a consuming endpoint or publishing endpoint, allows multidimensional risk analysis of this attack surface component.

External Resources

All of the data that is extracted from the application, infrastructure, and configuration code is later enriched with data that was consumed from 3rd party resources. These external resources enrich the findings with vulnerabilities or misconfigurations discovered by SAST, DAST, and IaC scanners, thus enriching the insights the system can provide and treat to mitigate the risk of an application in a multidimensional manner.

Cloud Providers

Any query-able cloud service could provide information about entities, in the form of introducing an entity, or by enriching an existing one. The process is similar to cloud components extraction from code repositories (source code, configurations, IaC, etc.).

When a new entity is introduced by a cloud provider, it is represented in the same form and goes into the matching and unifying process. When an entity is enriched by a cloud provider, it adds two types of information:

The first type of information is risk and remediation information about the entity. For example, a security policy that is referenced in an IaC file could be enriched by a cloud provider so that it is known which roles are allowed to access a resource.

The second type of information relates to the matching of entities. For example, an API handler may declare an HTTP route, and serve behind a network component. If the route is mentioned only in the cloud provider itself (e.g., AWS™ cluster entry points), the cloud provider provides a link between the API and the network component.

Scanners

Code scanners provide information about risk and remediation for entities. The form of information is contextless and thus may describe an incorrect state of an entity. For example, a scanner may flag an API as missing input validation, though one exists on a cloud network component.

The vulnerabilities listed by the scanners point to an entity (semantic reference), or an AST node (syntactic reference), or a file location (textual reference). Since the entity's representation described in the previous sections covers all the types of references, a matching between vulnerabilities and entities is direct.

Given the matched vulnerabilities, candidates of risks can be evaluated against the entity representation. The candidates can be filtered according to the full context of the entity, thus dismissing irrelevant ones.

Build Systems

Build systems process most or all of the code that is deployed to any production environment. The build process may have build scripts and configurations that complement the entities found in previous sections.

Using the information being extracted from build systems, two types of information could be added:

The first one is the enrichment of the entities. Since the scripts and configurations fill information by environment variables and template filling, relevant attributes values about the entities could be added. For example, if a template contains a placeholder for a server type or an HTTP route, the actual values are resolved.

The second type of information assists in linking the entities. For example, if multiple docker containers or several microservices are deployed together, an improved context can be created.

Developer Behavior

The expertise of a developer, along with the familiarity with the infrastructure and code being affected by a change, may imply what type of risk a change can introduce. The reason for it is that the expertise of a developer with specific entity types, infrastructure components, and architecture, influences the ability of the developer to address all the risks associated with an addition/change to the system. For example, a developer lacking expertise, such as the default encryption type in a cloud service, may miss the fact that at some given provider the default encryption could be weak, and unknowingly deploy a vulnerable service. Another example may be, if part of the system contains implicit assumptions, such as "service deployed to multiple environments", a developer may miss the fact that some environments are accessible from a public network and, as a result of that oversight, skip authentication requirements. This means that the likelihood of mistakes being made by a developer is higher when the developer lacks familiarity with the systems or expertise in general, or even in specific areas. Thus, knowing and classifying the level of expertise or familiarity of a developer that has provided a concrete code/infrastructure change can increase or decrease the assessed risk of that change.

By analyzing the past behavior of a developer across code repositories, ticketing systems, and other sources, an expertise and familiarity profile can be built automatically. The expertise profile is based on the extraction types defined in the previous sections, which can be used for building a profile having high granularity. The granularity can be on a component level, such as Lambda™ services, or on cross-components level, such as encryption, or on a process level, such as services integration. Given a change introduced by a developer, it can be evaluated against previous changes in different levels. For example, if a developer made many changes to encryption in the past, and most of the changes were approved, the assessed risk of a new change can be reduced.

The familiarity profile is based on the components the developer has affected in the past. Given that the extraction of entities, followed by unification and linking, a change to a specific entity can be mapped to the affected components. For example, if a change to service role in IaC is performed, the usages of that role, even non-code ones, are mapped. Using the mapped affected components of each past change, a familiarity for each component per developer can be built. Using that, a change made by a developer affecting components the developer is not familiar with, can be automatically detected and the assessed risk of that change can be increased.

Applications of the developer profile can prioritize issues for review, evaluate overall risk in the system, block abnormal changes, and trigger automatic workflows.

Prioritization

After entities are collected and governance rules are defined, a context-based and organization-specific level of severity can be formulated. The context has two aspects, one is the comprehensive state of the entities, and the other is the business importance of each entity. The importance can be derived from the organization rules, by prediction of impact, and by definition of business impact.

Thus, each entity's risk-wise state can be evaluated. The risk is detailed and is matched by the rules defined in the organization, while each rule can define both a severity level and a workflow. By combining the organization agnostic risk, the organization-specific risk (rules-based), the developer expertise and familiarity, and the impact, an importance-based risk order can be applied. Given the global order and individual risk, the most important issues can be identified and addressed by importance, and a global policy can be applied (such as "release blocker" for critical issues).

Based on the foregoing, the following summary of the process can be provided. FIG. 3 illustrates a flow diagram of a process 300 includes several steps:

Step 302—Definition of formal governance rules:
Allow organizations to define policies in a formal manner, such that well-formed entities can be verified against.

Step 304—Fetching data from multiple sources:
Connect to sources, such as code providers or cloud services, and fetch raw data in various formats.

Step 306—Extracting features from data:
Each source provides data that is either relevant or not in various formats. The features extraction step filters the relevant data in a unified manner.

Step 308—Formalizing sub-entities from extracted data:
Takes the features from each data source and represents a partial entity in a formal and unified manner Step 310—Matching and merging sub-entities into entities:
Takes sub-entities, matches those that represent the same entity, and merges the representations into a single entity.

Step 312—Aggregating risks and remediations for each entity:
For each sub-entity, the risks and remediations are collected and merged in a way that is aware of all sub-entities.

Optional Step 314—Enriching entities based on actors:
Different actors (e.g., coders, also referred to herein as "contributors") can contribute code or configurations, and each may have a different level of expertise. The actor information increases or decreases the risk of a changed entity.

Step 316—Computing risk priority and triggering workflows:
Given an entity composed of all sub-entities and actors, a context is formed, and a priority is assigned to each entity. Based on the matched governance rules and priorities, workflows are triggered.

While the invention has been described with respect to a limited number of embodiments, it will be appreciated that many variations, modifications, and other applications of the invention may be made. Therefore, the claimed invention as recited in the claims that follow is not limited to the embodiments described herein.

What is claimed is:

1. A method for unifying risks and remediations associated with entities in application and infrastructure code, comprising the steps of:
defining governance rules;
fetching data from more than one source;
extracting features from the data;
formalizing sub-entities from the extracted features, the formalized sub-entities representing the extracted features in a formal and unified manner;

providing a plurality of entities from the formalized sub-entities, matching and unifying sub-entities having common extracted features into single entities of the plurality of entities;

aggregating risks and remediations of each of the same sub-entities and assigning the aggregated risks and remediations to the corresponding single entity; and computing risk priority of the aggregated risks and triggering workflows that are based on the aggregated remediations and applied to the sub-entities that were matched and unified, the workflows to be ordered according to the risk priority and in keeping with the governance rules.

2. The method of claim 1, further comprising:

enriching the entities based on a level of expertise and familiarity of contributors, prior to the step of computing the risk priority.

3. The method of claim 1, wherein the governance rules are defined based on at least one of:

suggesting governance rules based on contextual data of unified or relatable entities, identifying missing governance rules, and importing of governance rules from other systems, based on similarities between entities of the other systems and the plurality of entities.

4. The method of claim 1, wherein at least some of the risks and remediations are provided by code scanners.

5. The method of claim 1, wherein entities are enriched using information extracted from build systems that process code to a production environment, the information including attribute values of the entities.

6. The method of claim 1, wherein said more than one source includes external resources.

* * * * *